US010168608B2

(12) United States Patent
Stout (10) Patent No.: US 10,168,608 B2
(45) Date of Patent: Jan. 1, 2019

(54) SAMPLING STAND FOR FOOD PRODUCTS IN A RETAIL STORE AND METHOD OF OPERATING A SAMPLING STAND (71) Applicant: Asda Stores Limited, Leeds (GB)

(72) Inventor: Philip Alexander Stout, Leeds (GB)

(73) Assignee: ASDA STORES LIMITED, Leeds (GB)

( * ) Notice: Subject to any disclaimer, the term of this patent is extended or adjusted under 35 U.S.C. 154(b) by 217 days.

(21) Appl. No.: 15/190,800

(22) Filed: Jun. 23, 2016

(65) Prior Publication Data
US 2016/0381332 A1 Dec. 29, 2016

(30) Foreign Application Priority Data

Jun. 26, 2015 (GB) .................................. 1511290.7

(51) Int. Cl.
G03B 21/14 (2006.01)
G03B 21/26 (2006.01)
H04N 9/31 (2006.01)
G06F 3/01 (2006.01)
G06Q 30/02 (2012.01)
G06Q 50/12 (2012.01)

(52) U.S. Cl.
CPC ........... *G03B 21/26* (2013.01); *G03B 21/145* (2013.01); *G06F 3/011* (2013.01); *G06Q 30/0261* (2013.01); *G06Q 50/12* (2013.01); *H04N 9/3179* (2013.01)

(58) Field of Classification Search
CPC .... G06F 3/011; G06Q 30/0261; G06Q 50/12; G03B 21/145; G03B 21/26; H04N 9/3179
See application file for complete search history.

(56) References Cited

U.S. PATENT DOCUMENTS

| 9,160,904 | B1* | 10/2015 | Chang | .................. | H04N 5/2251 |
| 2003/0066073 | A1 | 4/2003 | Rebh | | |
| 2004/0001002 | A1* | 1/2004 | Blum | ...................... | A47L 23/22 |
| | | | | | 340/573.1 |
| 2004/0217876 | A1 | 11/2004 | Blum et al. | | |
| 2006/0016957 | A1* | 1/2006 | Hofmann | ............... | B28D 1/043 |
| | | | | | 250/201.1 |
| 2015/0170206 | A1* | 6/2015 | Fagundo | ............ | G06Q 30/0261 |
| | | | | | 705/14.58 |

FOREIGN PATENT DOCUMENTS

WO 03098345 A1 11/2003

OTHER PUBLICATIONS

Search Report in counterpart UK Patent Application No. 1511290.7, dated Oct. 6, 2015; 4 pages.

* cited by examiner

*Primary Examiner* — Sultan Chowdhury
*Assistant Examiner* — Magda Cruz
(74) *Attorney, Agent, or Firm* — Schmeiser, Olsen & Watts LLP (57) ABSTRACT

A sampling stand for displaying samples of food products such as in a grocery retail store. A base unit of the sampling stand has a display worktop. A gantry is mounted above the base unit. A projector unit located in the gantry projects a visible image onto the display worktop of the base unit and/or onto a surrounding floor area. A motion sensor is arranged in the gantry and detects motions between the gantry and the base unit, and/or between the gantry and the floor area. A controller is configured to control the visible images projected by the projector dependent upon the motion sensed by the motion sensor.

19 Claims, 6 Drawing Sheets

SAMPLING STAND FOR FOOD PRODUCTS IN A RETAIL STORE AND METHOD OF OPERATING A SAMPLING STAND

RELATED APPLICATIONS

This application claims priority to United Kingdom Patent Application Serial No. 1511290.7, filed on 26 Jun. 2015 entitled "SAMPLING STAND FOR FOOD PRODUCTS IN A RETAIL STORE AND METHOD OF OPERATING A SAMPLING STAND," the entirety of which is incorporated by reference herein.

FIELD

The present disclosure relates in general to a sampling stand suitable for displaying samples of food products in a grocery retail store or other retail environment, and to a method of operating such a sampling stand.

BACKGROUND

Modern retail stores sell a wide variety of items, including foodstuffs, home and kitchen goods, electronic goods, clothing, sporting goods and so on. Typically, the items are displayed on shelves or other display units to be selected by customers and taken to a point of sale or checkout to be purchased. The display units are then replenished with new stock by staff, employees, or the like of the retail store, which is delivered to the store via a supply chain or held in reserve at the store.

It is desirable for a grocery retail store to offer samples of food products to customers, so that the customer can taste and enjoy a new food product prior to purchase. The retailer may work closely with their suppliers and manufacturers in order to promote certain products in a particular retail store on a particular day. These tasting events are typically relatively short-lived and frequently change from one product to another. Therefore, a temporary kiosk or stand may be set up at a prominent location in a store to display the products to be sampled. The sampling stand may be disassembled or removed when not in use.

There are several design issues to be considered in relation to the sampling stand. When offering food products, the sampling stand has to maintain excellent standards of hygiene. The stand should be robust and durable, and maintain an attractive appearance even after being used many times for different promotions. Typically, the stand will carry signage or other display materials appropriate to the current promotion, which are temporarily affixed to the stand and are replaced after use in the current promotion or event.

It is an aim of the present invention to address at least some of the above difficulties, or other difficulties as will be appreciated from the description herein. Some examples described herein may aim to provide an improved sampling stand and method of operating such as sampling stand.

SUMMARY

According to the present inventive concepts, there is provided a sampling stand and a method of operating a sampling stand. Other features of the inventive concepts will be apparent from the dependent claims, and from the description herein.

In one aspect, there is described a sampling stand for displaying samples of food products such as in a grocery retail store. The sampling stand comprises a base unit configured to rest in use on a floor, the base unit having a display worktop at an upper part of the base unit for displaying the samples; a gantry mounted above the display worktop of the base unit by one or more supports between the gantry and the base unit; a projector unit at the gantry to project a visible image onto the display worktop of the base unit; a motion sensor at the gantry to detect motion between the gantry and the base unit; and a controller configured to control the visible images projected by the projector dependent upon the detected motion.

In another aspect, there is described a sampling stand for displaying samples of food products in a grocery retail store, comprising: a base unit configured to rest in use on a floor and having a display worktop at an upper part of the base unit for displaying the samples; a gantry mounted above the base unit by one or more supports, wherein the gantry is supported above the display worktop of the base unit; a projector unit located in the gantry to project a visible image onto the display worktop of the base unit; a motion sensor arranged in the gantry to detect motion between the gantry and the base unit; and a controller configured to control the visible images projected by the projector dependent upon the motion sensed by the motion sensor.

In one example, the projector unit is further arranged to project the visible image onto the display worktop of the base unit and onto an area of the floor surrounding the base unit, wherein the motion sensor mounted in the gantry is arranged to detect motion between the gantry and the base unit and between the gantry and the floor, and wherein the controller is configured to control the visible images projected by the projector unit dependent upon motions sensed by the motion sensor.

In one example, the projector unit comprises a first projector arranged to project visible images onto the display worktop and a second projector arranged to visible images onto the floor area around the base unit.

In one example, the controller is configured to selectively switch between activating one of the first projector and the second projector according to the motion sensed by the motion sensor.

In one example, the motion sensor is configured to derive a skeletal model of a person in a monitored volume, and wherein the controller is configured to control the visible images from the projector unit according to changes in the skeletal model as determined by the motion sensor.

In one example, the motion sensor is configured to recognize gestures above the display worktop and the controller is configured to change the visible images from the projector unit in response to a gesture recognized by the motion sensor.

In one example, the controller is configured to operate the sampling stand in a first mode using the projector unit to project images onto the display worktop while the motion sensor monitors motion in a first motion detecting region in a volume over the display worktop, and to operate in a second mode using the projector unit to project images onto the floor area around the base unit while the motion sensor monitors motion in a second motion detecting region over the floor area, and to selectively switch between the first mode and the second mode according to motion information from the motion sensor.

In one example, the sampling stand is a self-supporting free standing structure.

In one example, the sampling stand is mobile and configured to be readily moved from one location to another.

In one example, the one or more supports includes first and second support ports, and the gantry is mounted above the base unit by the first and second support posts each having a lower end attached to the base unit and an upper end which supports the gantry.

In one example, the support posts are adjustable in length and configured to allow the gantry to be raised or lowered in relation to the base unit.

In one example, the display worktop is a smooth continuous surface which is cleanable and hygienic.

In another aspect, there is described a method of operating a sample stand in a grocery retail store, comprising: projecting visible images from a projector unit in a gantry downwardly onto a display worktop of a base unit of the sampling stand, the gantry being supported above the base unit; detecting motion between the gantry and the base unit by a motion sensor arranged in the gantry; and controlling the visible images projected by the projector unit dependent upon the detected motion.

In one example, the projecting step further comprises projecting visible images onto the display worktop of the base unit and onto an area of the floor surrounding the base unit, the detecting step further comprises detecting motion between the gantry and the base unit and between the gantry and the floor, and the controlling step further comprises controlling the visible images projected by the projector unit dependent upon motions sensed by the motion sensor.

In one example, the method includes selectively switching between activating one of a first projector which projects visible images onto the display worktop and a second projector which projects visible images onto the floor area around the base unit, according to the motion sensed by the motion sensor.

In one example, the method includes deriving a skeletal model of a person in a monitored volume by the motion sensing, and controlling the visible images from the projector according to changes in the skeletal model.

In one example, the method includes operating the sampling stand in a first mode by projecting images onto the display worktop while monitoring motion in a first motion detecting region in a volume over the display worktop, operating the sampling stand in a second mode by projecting images onto the floor area around the base unit while monitoring motion in a second motion detecting region over the floor area, and selectively switching between the first mode and the second mode according to motion information from the motion sensor.

In one example, the method includes entering a first mode and performing a predetermined interaction sequence in relation to visible images projected onto a first image display region while simultaneously sensing motion in a first monitoring zone which is substantially co-located with the first image display region; examining the detected motion and when the motion meets a predetermined condition transitioning to a second mode based on the detected motion; and in the second mode, projecting visible images onto a second image display region while simultaneously sensing motion in a second monitoring zone which is substantially co-located with the second image display region.

In one example, the method includes recognizing a motion in the first monitoring zone and selectively performing another step of the predetermined interaction sequence by changing the first monitoring zone to another location and changing the visible images projected onto the first image display region.

In one example, the method includes recording interactions of a customer with the sampling stand according to the detected motion.

In one example, there is provided a tangible non-transient computer readable medium having instructions recorded thereon which when executed by a computer device perform any of the methods described herein.

BRIEF DESCRIPTION OF DRAWINGS

For a better understanding of the invention, and to show how example embodiments may be carried into effect, reference will now be made to the accompanying drawings in which.

In the drawings, corresponding reference characters indicate corresponding components. The skilled person will appreciate that elements in the drawings are illustrated for simplicity and clarity and have not necessarily been drawn to scale. For example, the dimensions of some of the elements may be exaggerated relative to other elements to help to improve understanding of various example embodiments. Also, some common and well-understood elements that are useful or necessary in a commercially feasible embodiment are often not depicted in order to facilitate a less obstructed view of these various example embodiments.

DESCRIPTION OF EXAMPLE EMBODIMENTS

At least some of the following examples show a sampling stand and operating method which are suitable for use in a network of grocery retail stores. Many other advantages and improvements will be discussed in more detail below, or will be appreciated by the skilled person from carrying out example embodiments based on the teachings herein. The example embodiments have been described particularly in relation to a retail store such as a supermarket or general store for grocery and household items. However, it will be appreciated that the example embodiments may be applied in many other specific environments.

Figure 1:
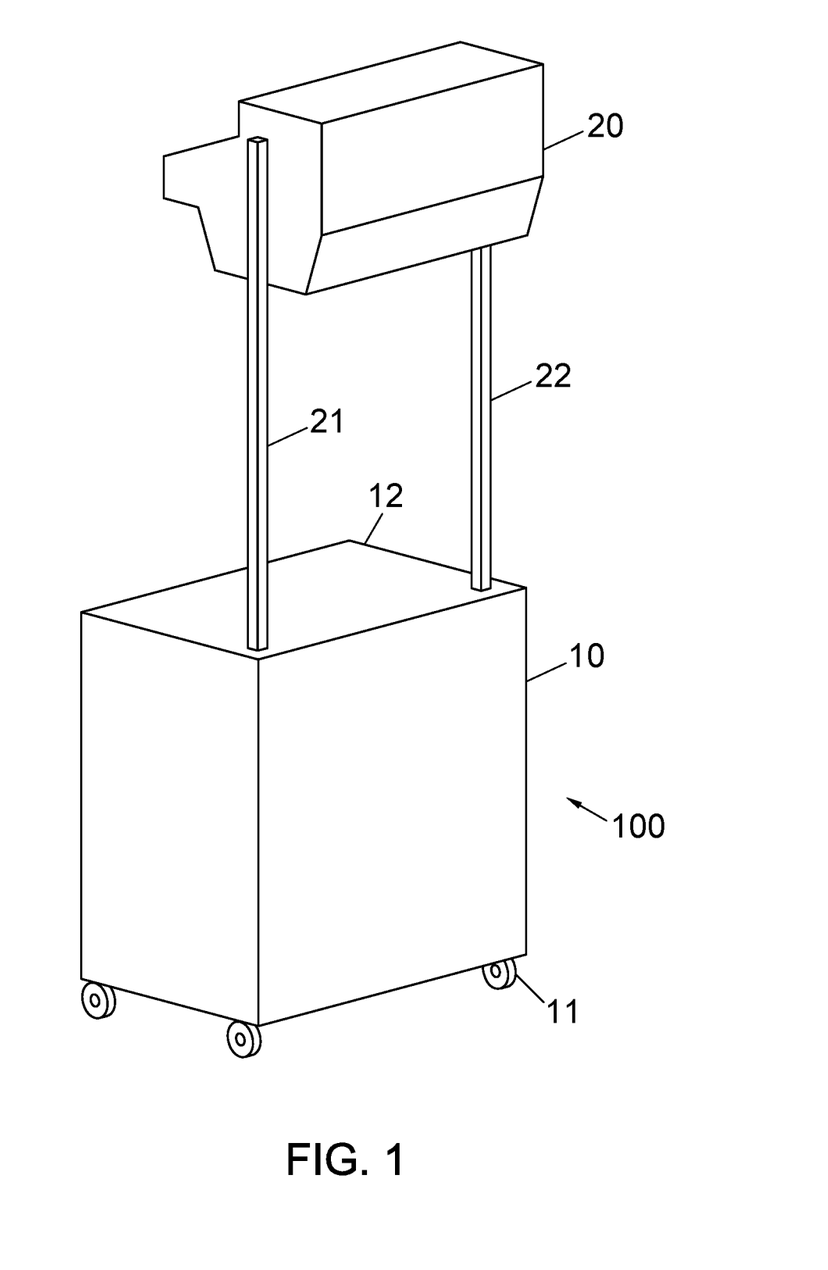
FIG. 1 is a perspective view of an example sampling stand.

FIG. 1 shows an example embodiment of a sampling stand 100 which is suitable for displaying samples of food products in a grocery retail store or other retail environment.

In this example, the stand 100 is a self-supporting structure which will remain in the illustrated configuration without additional support or installation. Suitably, the stand 100 is a free-standing structure which does not need to be affixed to walls or other fixtures in the store. The stand 100 may be mobile and thus is configured to be easily moved from one location to another. For example, the stand may be carried or carted from one location to another. In this example, the stand 100 is a self-contained unit which needs minimal engagement or physical installation in the current desired location.

In this example, the sampling stand 100 includes a base 10 and a gantry 20. The base unit 10 may be generally cuboid, e.g. having substantially flat and planar exterior surfaces, but it will be appreciated that the base unit 10 may take any suitable physical form. For example, the upright walls of the base unit 10 may be curved or sculpted in appearance. The exterior walls of the base unit 10, and likewise the gantry 20, may be used to mount temporary signage (e.g. printed paper sheets) relevant to a current promotion or event. An interior of the base unit 10 may be configured for storage, such as with drawers, cupboards and/or shelving. A lower part of the base unit 10 suitably includes legs or similar ground contacting elements. In this example the base unit 10 is provided with one or more wheels 11, allowing the stand 100 to be easily wheeled into a desired position within a retail store when needed, or removed for storage when not in use.

An upper part of the base unit 10 provides a display worktop 12. In one example, the display worktop 12 is a surface which is provided in order to support product samples which are to be offered from the stand 100. The display worktop 12 may be a substantially horizontal surface extending across the top of the base unit 10. Typically, the stand 100 will be used to offer product samples which are food items. Thus, the worktop 12 may be used to prepare the food samples (e.g. cutting or chopping the food ready for the customer to sample). In a grocery retail store, the retailer or their suppliers and manufacturers often desire to offer products samples to customers, and these sampling events or promotions change frequently. Therefore, the display worktop 12 should be a material that is hygienic and easily cleaned. It is desirable to avoid recesses where dirt or detritus might accumulate. The display worktop 12 may be a smooth, continuous surface, as in this example.

Generally, the gantry 20 is located in use above the base unit 10. The gantry 20 is arranged vertically higher than the base unit 10. When considering the stand 100 from above in plan view, the gantry 20 suitably overlies the base unit 10. In this example the gantry 20 partially overlies the base unit 10, and partially extends forwardly from the base unit 10 on the front side from which a customer will typically approach the stand. In this way, the gantry 20 is appropriately positioned over the display worktop 12 and is also able to view a floor area in front of the base unit 10 without undue interference by the base unit 10.

In this example, the gantry 20 is held above the base unit 10 by at least one support, for example, a pair of support posts 21, 22. A lower end of each support post 21, 22 may be mounted to the base unit 10. The gantry 20 may be affixed to or suspended between upper ends of the support posts 21, 22. In one example the support posts 21, 22 may be adjustable in length, e.g. telescopic or the like, having a locking mechanism to retain them an extended position. Thus, the gantry 20 may be lowered toward the base unit 10, such as when the stand 100 is moved or stored while not in use, and may be raised above the base unit 10 when in an operating configuration. In other examples, the support posts 21, 22 may have a fixed length.

Figure 2:
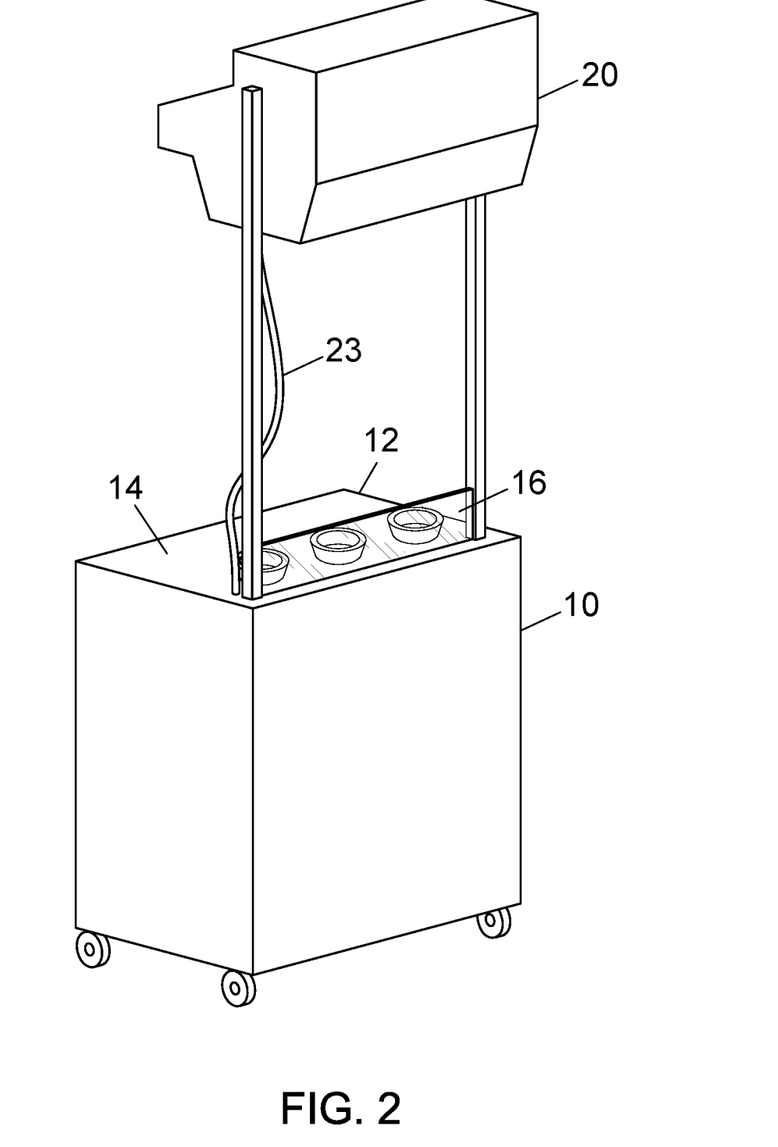
FIG. 2 is another perspective view of the example sampling stand in more detail.

FIG. 2 shows the display stand 100 in more detail. In this example, the stand 100 may be provided with a trailing power cable 23, in order to take electrical power from a suitable nearby power socket. The power cable 23 may enter the base unit 10 and be directed along one of the support posts 21 to reach the gantry 20. Thus, power is supplied to the electrical components mounted in the gantry 20 when the stand 100 is in use.

In this example, the display worktop 12 is configured to include a removable and readily cleanable surface portion 14. A screen 16 may be provided in this case conveniently located between the support posts 21, 22. The screen 16 may serve as a safety and hygiene barrier. The screen 16 may inhibit spillage from the display worktop 12, but allows customers to view the product samples which are offered.

Figure 3:
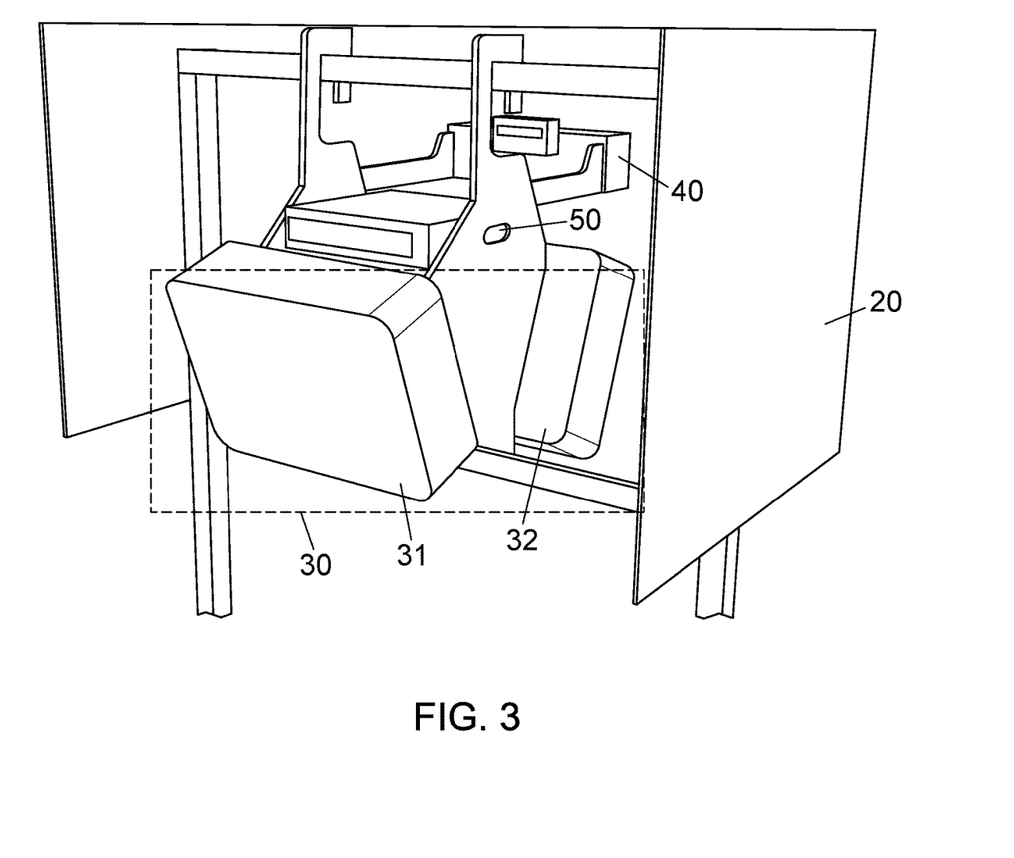
FIG. 3 is a cut-away view of a gantry portion of the sampling stand.

FIG. 3 is a schematic cut-away view showing an interior of the gantry 20. In this example the gantry 20 houses a projector unit 30, which as shown may include two individual projectors 31, 32 but not limited thereto. The gantry 20 may further house a motion sensor 40 and a controller 50. In use, the controller 50 is coupled to the projector 30 and the motion sensor 40, such as by a suitable local wired or wireless communication connection for exchanging electrical signals. In one example, the projector 30 and the motion sensor 40 are coupled to the controller 50 by USB (Universal Serial Bus) cables or the like.

Conveniently, the projector unit 30 is mounted in the gantry 20 and is directed downwardly from the gantry 20 toward the base unit 10. Thus, the projector 30 may project visible images in particular onto the display worktop 12 of the base unit 10. In some examples, the projector 30 may also project the visible images also onto a floor area surrounding the base unit 10. In the illustrated example, the gantry 20 houses a first projector 31 and a second projector 32, which are separate and physically distinct components, e.g. two separate commodity projector units, These projectors 31, 32 project a visible image according to image signals supplied from the controller 50, e.g. along respective first and second USB connections, respectively.

In this example, first projector 31 is focused or directed toward the display worktop 12 of the base unit 10 and in which case may have a relatively narrow field of view. Meanwhile, the second projector 32 is focused or directed to the floor area around the base unit 10 and thus has a relatively wide field of view. In this way, the sampling stand 100 is able to project clear and attractive visible images both onto the display worktop 12 and onto the floor area, using the first and second projector units 31, 32, respectively.

Meanwhile, the motion sensor 40 may be housed in the gantry 20 and conveniently directed generally downwardly toward the base unit 10. Thus, the motion sensor 40 is arranged to detect motion particularly in a volume beneath the gantry 20 and toward the base unit 10. In one example, the motion sensor 40 has a field of view which is sufficient to also detect motion over a floor area at or near, e.g., adjacent to, the base unit 10. Particularly, the motion sensor 40 has a field of view which is capable of detecting motion as a customer approaches the base unit 10.

In another example, a plurality of individual motion sensors may be arranged to detect motion at separate and distinct areas. Thus, for example, a first motion sensor unit may be focused toward detecting motion in the volume above the base unit (i.e. motion above the display worktop). A second motion sensor may be focused specifically toward motion in the floor area surrounding the base unit. Other specific example implementations will also be apparent from the discussion herein.

In one example, the motion sensor 40 may comprise cameras or related sensors and/or infra-red detectors which are directed toward the monitored volume, and a processor which determines complex and refined motion information based on inputs from the cameras and/or detectors. The motion sensor 40 can therefore detect, or sense motion between the gantry 20 and the base unit 10. The motion sensor 40 may then output motion information to the controller 50 in various forms. For example, the motion sensor 40 may define skeletal models for one or more persons who are detected within the monitored volume and output the movement information in terms of the position and movement of a skeletal system of a human, e.g. hands, arms, neck, head, torso, and so on. In some examples the motion sensor may be configured to recognize hand gestures, such as by the skeletal model having a resolution of individual fingers or finger joints. The motion sensor 40 may be a commodity motion sensor which is coupled to the controller 50 such as by a USB connection.

Figure 4:
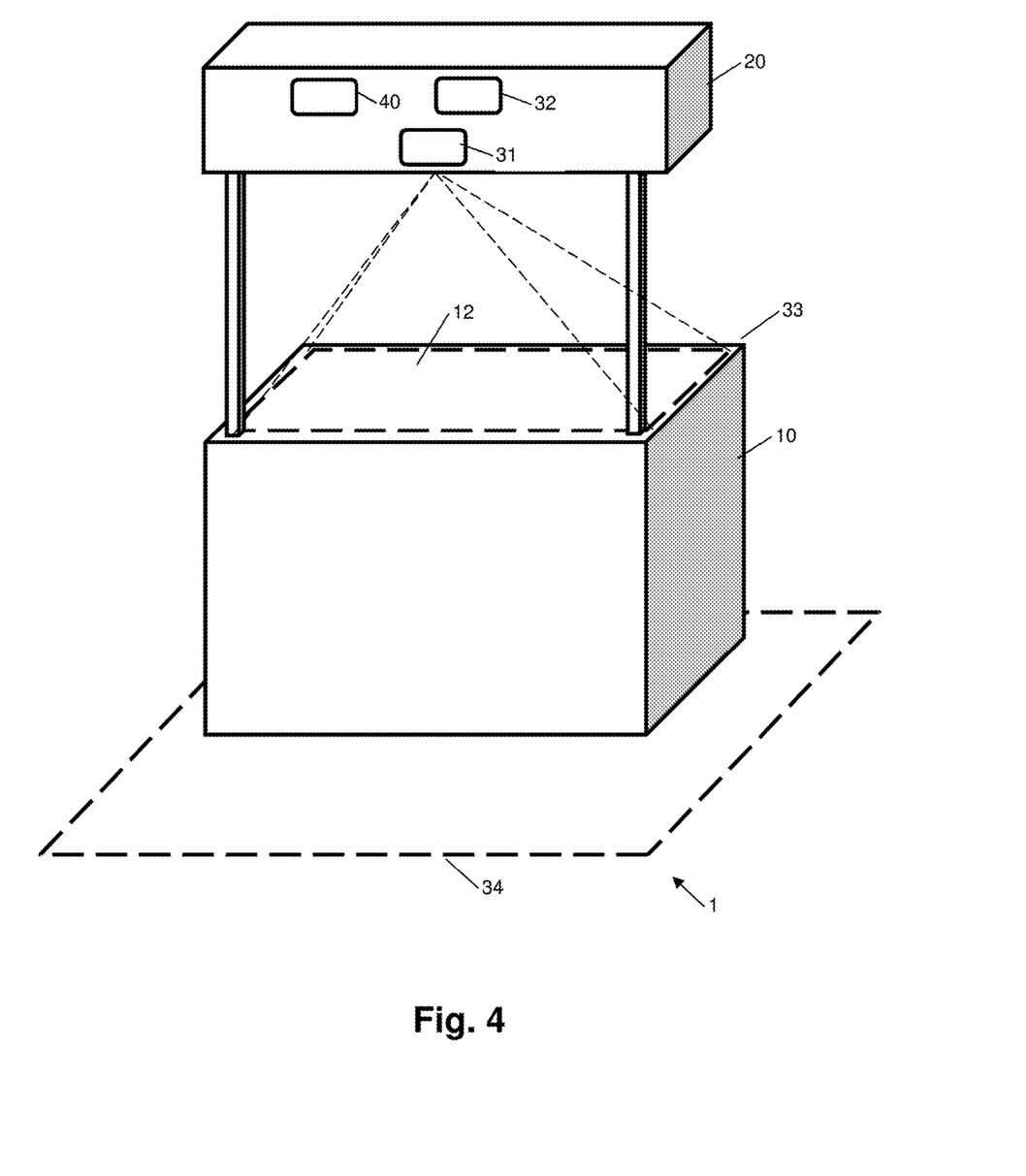
FIG. 4 is a schematic perspective view of the sampling stand in use.

FIG. 4 shows the projector 30, here with two projectors 31, 32, in use on the stand 100. The first projector 31 generates visible images in a first projected image field 33. The first field 33 may be focused toward the display worktop 12 of the base unit 10. Thus, the first projector 31 generates visible images which are viewable upon the display worktop 12. In this way, the first projector 31 can be controlled by the controller 50 to generate images which are relevant to the products being displayed and which are attractive for potential customers. The projector 31 allows interesting and evocative images to be generated and displayed onto the whole display worktop 12, or onto selected parts of the worktop. For example, the displayed images may highlight particular areas within the first field 33, which may draw the attention of the customer to particular parts of the display worktop 12 in turn. In one example, moving images (e.g. video sequences, GIF sequences or similar) may be generated within the first field 33 and projected toward the display worktop 12 from the first projector 31.

The second projector 32 is provided to project images into a second projected image field 34 which in this case is intended to be viewed on areas of the floor 1 surrounding the base unit 10. In this way, the second projector 32 generates static images or moving images (video) over all or part of the second image field 34 at any one time. This second field 34 may be larger and broader than the first field 33 and may extend beyond the base unit 10 in at least one direction. In one example the second image field 34 surrounds the base unit 10 at least forwardly toward potential customers. The image field 34 may extend to one or more sides of the base unit 10. The image field 34 may extend rearwardly from the base unit 10, toward a side where a product representative or supervisor of the sampling stand would normally be present.

Figure 5:
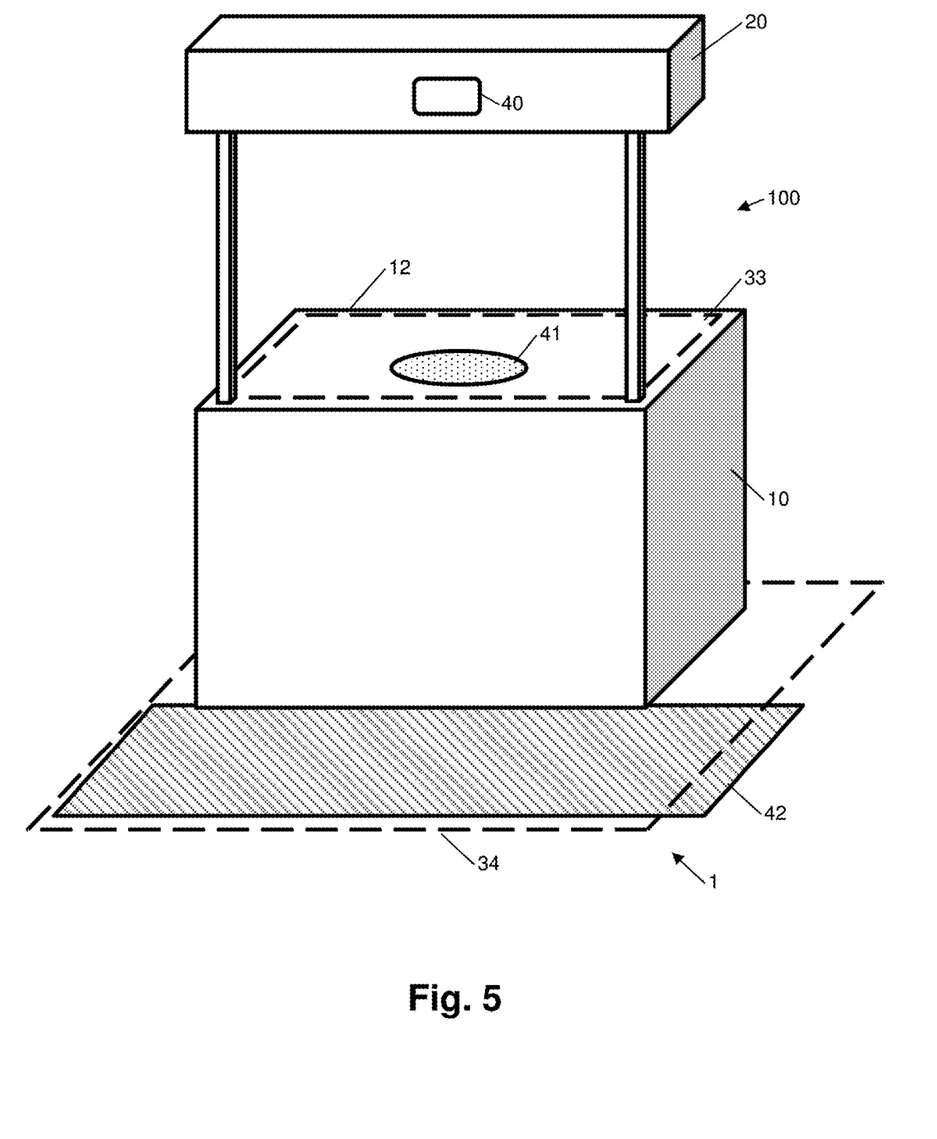
FIG. 5 is another schematic perspective view of the sampling stand in use.

FIG. 5 is a further schematic view of the sampling stand 100 in use. Here, the motion sensor 40 is configured to detect motion in one or more predetermined motion detecting regions 41, 42. In this example, at least one first motion detecting region 41 is defined which is co-located within the first image field 33 from the first projector 31. In this case, the first image field 33 and the first motion detection region 41 are both directed toward the display worktop 12 of the base unit 10. Now, it is possible for the controller 50 to both control the images directed onto the display worktop 12 by the projector 31 and to perform gesture recognition by using motion inputs detected by the motion sensor 40, bringing many new and interesting options for the customer to engage with the sampling stand. For example, by projecting certain images from the projector 31 into the first display field 33, the customer is encouraged to move to certain regions of the display worktop 12 and to perform certain gestures or actions which are recognized by the motion sensor 40. The projected images may then be updated accordingly, with an appropriate sequence of actions being defined by the controller 50 depending upon the choices or inputs received through the motion sensor 40 from the customer. For example, the customer can be encouraged to choose between a banana flavour or a strawberry flavour product and to register their preference by touching appropriate areas on the display worktop 12, which may be highlighted by the projected images, or by making appropriate hand gestures (e.g. a thumbs-up gesture), which are recognized by the motion sensor 40.

As further illustrated in FIG. 5, in this example, a second motion detecting region 42 may be defined on the floor area 1 surrounding the base unit 10. This second motion detecting zone 42 may, or may not, be exactly aligned with the projected images 34. Thus the monitoring zone 42 and the projected image field 34 are conveniently overlapping but are not necessarily co-extensive. Suitably, the projected images in the second image zone 34 encourage the customer to approach the sampling stand 100. In use, the second motion detecting zone 42 is monitored by the motion sensor 40 to detect those customers who approaches the stand. Again, in this example, the projected images and the motion sensing work together cooperatively to enhance the customer's experience of the display stand.

In one example, the controller 50 is arranged to transition the sampling stand through a number of different modes. In one operating mode, the second projector 32 is activated to display images into the second projected image field 34 and the second motion zone 42 is monitored, until a customer is detected approaching the sampling stand. This operation mode thus functions as a call to action, in which the displayed images are intended to encourage customers to visit the sampling stand 100. Upon detecting a customer, e.g. a new skeletal frame is signaled in the motion information from the motion sensor 40, the controller 50 may assess motion factors such as the size, position, orientation and locomotion of the customer. At which point, the controller 50 may transition the stand to an active sampling mode, wherein the first projector 31 is activated to display images into the first image field 33 and the motion sensor 40 is focused on the first motion detecting regions 41. This active mode may progress through a suitable sequence of interactions to assist the customer in exploring the product samples. These interactions may be recorded in order to gain feedback from the customer. For example, feedback may include questions whether the customer like the product and have they formed an intention to purchase the product. Also, the controller may capture meta-data in relation to the customer's visit to the stand, such as a duration of their visit and a ratio of interest in particular parts of the stand. The controller 50 may then transition the stand 100 back to the first mode to await the approach of another customer.

The controller 50 may be configured to selectively activate at least one of the two projectors 31, 32 at any one time. The second projector 32 with the larger display field 34 may illuminate the display worktop 12 as well as the surrounding floor area. Thus, the first projector 31 may be deactivated while the second projector 32 is active. Conversely, the second projector 32 may be deactivated while the first projector 31 is activate in order to focus precisely onto the display worktop 12. The controller 50 may switch over from one projector 31, 32 to the other, consistent with transitioning between the multiple operating modes.

Thus, the projected images and the motion detection or sensing may be coordinated and controlled by the controller 50 in spatial and temporal domains. Spatially, the images and motion sensing are coordinated in terms of location, i.e. projecting an image which highlights a particular part of the field and then looking specifically for motion in that location. Temporally, the images and motion sensing may be coordinated by the controller 50 so that a desired interaction is achieved at a particular time. Multiple spatially and temporally coordinated interactions may be defined in advance in a sequence and the interaction sequence then followed by the controller either linearly or with choices depending upon the results of the interaction with this particular customer. The controller 50 may include a storage unit which records the result of user interactions with the sampling stand to be examined or uploaded later, e.g., regardless of whether the user entered the monitored floor area and then engaged with the samples on the display worktop, whether they registered a preference or dislike for the samples, and so on. In another example, the results may be transferred from the stand 100 in real time or near real time via an online connection, such as a local WiFi network interface to a computer network in the retail establishment.

Figure 6:
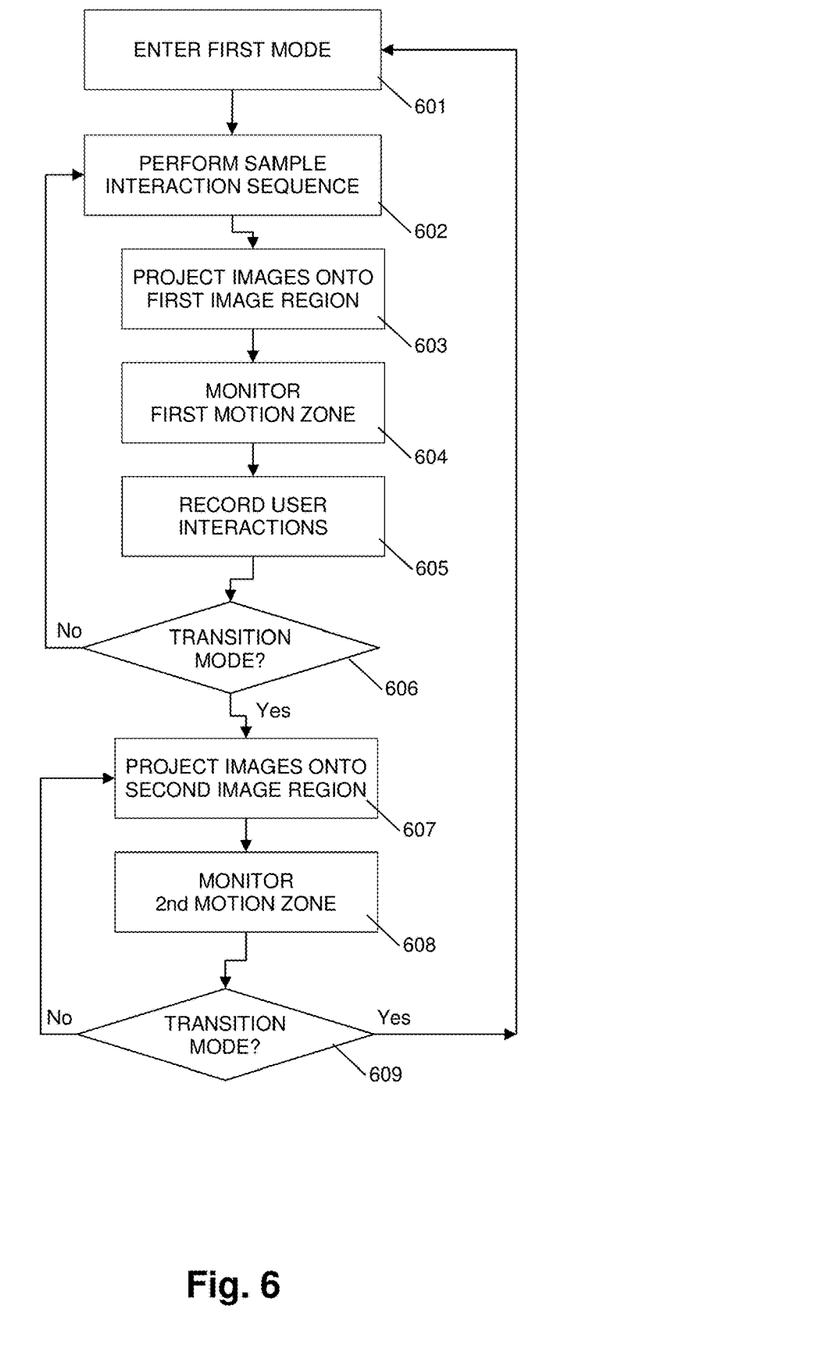
FIG. 6 is a schematic flowchart of an example method of operating the sampling stand.

FIG. 6 is a flow chart of an example method of operating the sampling stand. Method steps may be performed by elements of the example sampling stand 100 discussed herein. Conveniently, the method is suitable for operating a sampling stand which in use is offering food product samples in a grocery retail store.

In one example the method may comprise entering a first mode at step 601 to prepare for action. At step 602, a predetermined interaction sequence is performed. In this first mode, the method may include projecting images from a projector onto a first image display region as in step 603, and monitoring in step 604 a first monitoring zone which is substantially co-located with the first image area with a motion sensor. The monitoring may continue while motion or gestures are detected. The projecting step 603 and the monitoring step 604 are suitably performed simultaneously. In one example, in this first mode, attention is focused on a display worktop and motion detecting zones are monitored accordingly, in cooperation with the displayed images. Interactions of the customer may be recorded as in step 605. The method may comprise examining the detected motion at step 606, and determining whether or not to transition to a second mode based on the detected motion. When the interaction sequence is determined to be finished at step 606, e.g. because the customer moves away from the stand and thus motion is discontinued, then the method may transition to a second operating mode. In this second mode images are projected onto a second image display region which is different from the first region, as in step 607. A further motion sensing may be performed in relation to a second monitoring zone, which in this case may be the floor area around the stand, as in step 608. A sequence of images may be displayed while waiting until a customer is detected in the second monitoring zone as in step 609. Here, a determination may be made to revert to the step 601 to begin the interaction sequence for this customer in relation to the product samples on the display worktop.

In summary, an improved sample stand has been described which is ideally suited for sampling food products in a retail establishment such as a grocery retail store. A base unit and display worktop of the stand may be hygienic and easily maintained in a safe working condition. A gantry houses the projector and motion sensors safely and conveniently. The example sample stand offers improved interactions for the customer, beyond simply sampling the products themselves, such as by displaying information and offering attractive images directly onto the display worktop over and around the sample products. Further, the sample stand may project images onto the surrounding floor area, thereby greatly increasing the impact and attractiveness of the stand. The controller may use a motion sensor to detect that a customer is approaching, and transition into an active mode for sampling the products.

Although a few preferred embodiments have been shown and described, it will be appreciated by those skilled in the art that various changes and modifications might be made without departing from the scope of the invention, as defined in the appended claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality.

In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination.

In particular, the features of any one example embodiment may be combined with features of any other embodiment, as appropriate, except where such combinations are mutually exclusive. Throughout this specification, the term "comprising" or "comprises" or related terms such as "including" or "includes" or means including the component(s) specified but not to the exclusion of the presence of others.

The invention claimed is:

1. A sampling stand for displaying samples in a retail store, comprising:
    a base unit configured to rest in use on a floor, the base unit having a display worktop at an upper part of the base unit for displaying the samples;
    a gantry mounted above the display worktop of the base unit by one or more supports between the gantry and the base unit;
    a projector unit at the gantry to project a visible image onto the display worktop of the base unit;
    a motion sensor at the gantry to detect motion between the gantry and the base unit; and
    a controller configured to control the visible image projected by the projector dependent on the detected motion, including performing operations of:
    entering a first mode and performing a predetermined interaction sequence in relation to visible images projected onto a first image display region while simultaneously sensing motion in a first monitoring zone which is substantially co-located with the first image display region;
    examining the detected motion and when the motion meets a predetermined condition transitioning to a second mode based on the detected motion; and
    in the second mode, projecting visible images onto a second image display region while simultaneously sensing motion in a second monitoring zone which is substantially co-located with the second image display region.

2. The sampling stand of claim 1, wherein the projector unit is further arranged to project the visible image onto the display worktop of the base unit and onto an area of the floor surrounding the base unit, wherein the motion sensor mounted in the gantry is arranged to detect motion between the gantry and the base unit and between the gantry and the floor, and wherein the controller is configured to control the visible images projected by the projector unit dependent upon motions sensed by the motion sensor.

3. The sampling stand of claim 1, wherein the projector unit comprises a first projector arranged to project visible images onto the display worktop and a second projector arranged to visible images onto the floor area around the base unit.

4. The sampling stand of claim 3, wherein the controller is configured to selectively switch between activating one of the first projector and the second projector according to the motion sensed by the motion sensor.

5. The sampling stand of claim 1, wherein the motion sensor is configured to derive a skeletal model of a person in a monitored volume, and wherein the controller is configured to control the visible images from the projector unit according to changes in the skeletal model as determined by the motion sensor.

6. The sampling stand of claim 1, wherein the motion sensor is configured to recognize gestures above the display worktop and the controller is configured to change the visible images from the projector unit in response to a gesture recognized by the motion sensor.

7. The sampling stand of claim 1, wherein the controller is configured to operate the sampling stand in the first mode using the projector unit to project images onto the display worktop while the motion sensor monitors motion in a first motion detecting region in a volume over the display worktop, and to operate in the second mode using the projector unit to project images onto the floor area around the base unit while the motion sensor monitors motion in a second motion detecting region over the floor area, and to selectively switch between the first mode and the second mode according to motion information from the motion sensor.

8. The sampling stand of claim 1, wherein the sampling stand is a self-supporting free standing structure.

9. The sampling stand of claim 1, wherein the sampling stand is mobile and configured to be readily moved from one location to another.

10. The sampling stand of claim 1, wherein the one or more supports includes first and second support posts, and wherein the gantry is mounted above the base unit by the first and second support posts each having a lower end attached to the base unit and an upper end which supports the gantry.

11. The sampling stand of claim 1, wherein the support posts are adjustable in length and configured to allow the gantry to be raised or lowered in relation to the base unit.

12. The sampling stand of claim 1, wherein the display worktop is a smooth continuous surface which is cleanable and hygienic.

13. A method of operating a sample stand in a retail store, comprising:
projecting visible images from a projector unit in a gantry downwardly onto a display worktop of a base unit of the sampling stand, the gantry being supported above the base unit;
detecting motion between the gantry and the base unit by a motion sensor arranged in the gantry;
controlling the visible images projected by the projector unit dependent upon the detected motion;
entering a first mode and performing a predetermined interaction sequence in relation to visible images projected onto a first image display region while simultaneously sensing motion in a first monitoring zone which is substantially co-located with the first image display region;
examining the detected motion and when the motion meets a predetermined condition transitioning to a second mode based on the detected motion; and
in the second mode, projecting visible images onto a second image display region while simultaneously sensing motion in a second monitoring zone which is substantially co-located with the second image display region.

14. The method of claim 13, wherein:
the projecting step further comprises projecting visible images onto the display worktop of the base unit and onto an area of the floor surrounding the base unit,
the detecting step further comprises detecting motion between the gantry and the base unit and between the gantry and the floor, and
the controlling step further comprises controlling the visible images projected by the projector unit dependent upon motions sensed by the motion sensor.

15. The method of claim 13, further comprising:
selectively switching between activating one of a first projector which projects visible images onto the display worktop and a second projector which projects visible images onto the floor area around the base unit, according to the motion sensed by the motion sensor.

16. The method of claim 13, further comprising deriving a skeletal model of a person in a monitored volume by the motion sensing, and controlling the visible images from the projector according to changes in the skeletal model.

17. The method of claim 13, further comprising:
operating the sampling stand in the first mode by projecting images onto the display worktop while monitoring motion in a first motion detecting region in a volume over the display worktop,
operating the sampling stand in the second mode by projecting images onto the floor area around the base unit while monitoring motion in a second motion detecting region over the floor area, and
selectively switching between the first mode and the second mode according to motion information from the motion sensor.

18. The method of claim 13, further comprising recognizing a motion in the first monitoring zone and selectively performing another step of the predetermined interaction sequence by changing the first monitoring zone to another location and changing the visible images projected onto the first image display region.

19. The method of claim 13, further comprising recording interactions of a customer with the sampling stand according to the detected motion.

* * * * *